(12) United States Patent
Stuart

(10) Patent No.: US 7,350,761 B1
(45) Date of Patent: Apr. 1, 2008

(54) SOFT HOSE PEDAL VALVE

(76) Inventor: John J. Stuart, P.O. Box 5005, Enid, OK (US) 73702

( * ) Notice: Subject to any disclaimer, the term of this patent is extended or adjusted under 35 U.S.C. 154(b) by 11 days.

(21) Appl. No.: 11/446,803

(22) Filed: Jun. 5, 2006

Related U.S. Application Data

(60) Provisional application No. 60/698,765, filed on Jul. 13, 2005.

(51) Int. Cl.
  *F16K 7/04* (2006.01)
(52) U.S. Cl. .................................. 251/10; 251/9; 251/4
(58) Field of Classification Search ..................... 251/4, 251/9, 10
  See application file for complete search history.

(56) References Cited

U.S. PATENT DOCUMENTS

| | | | |
|---|---|---|---|
| 820,216 A | * | 5/1906 | Leffingwell et al. .......... 251/10 |
| 4,193,174 A | * | 3/1980 | Stephens ..................... 24/532 |
| 4,247,076 A | * | 1/1981 | Larkin ........................... 251/7 |
| 4,453,295 A | * | 6/1984 | Laszczower ................. 251/10 |
| 4,800,920 A | * | 1/1989 | Yusko et al. ................ 137/556 |
| 6,196,519 B1 | * | 3/2001 | Utterberg ..................... 251/10 |
| 6,364,279 B1 | * | 4/2002 | Neftel et al. .................. 251/9 |
| 6,644,618 B1 | | 11/2003 | Balbo |

OTHER PUBLICATIONS

United States Plastic Corp—4 pages from website showing Easy Open Clamps.

\* cited by examiner

*Primary Examiner*—John K. Fristoe, Jr.
(74) *Attorney, Agent, or Firm*—Gable Gotwals

(57) ABSTRACT

A pedal-operated valve is provided controls the rate of fluid flow in a soft hose. A cradle positions a section of the hose so that its cross-sectional area can be compressed by the hinged rotation of a pinchcock toward the cradle in response to a pedal force to reduce the rate of flow. The compressed cross-section expands in response to the internal fluid pressure of the hose upon release of the pedal force to increase the rate of flow. A latch secures the pinchcock in an angular orientation relative to the cradle to maintain the reduced cross-sectional area. A lever is pedal operated to disengage the pinchcock from the latch.

17 Claims, 4 Drawing Sheets

SOFT HOSE PEDAL VALVE

CROSS REFERENCE TO RELATED APPLICATION

This application is a regular application based on provisional application Ser. No. 60/698,765, filed on Jul. 13, 2005, entitled Flow Restrainer and Regulator.

BACKGROUND OF THE INVENTION

This invention relates generally to fluid flow control valves and more particularly concerns pedal operated valves for control of fluid flow rates in soft tubes, such as water flow in garden hoses.

Known soft hose flow control valves are essentially of two types. One type requires structural insertion of a valve component into the fluid flow path. Such valves can only be used at one or more specific junction points along the flow path, such as at the connection point of two separate hoses forming a part of the flow path. They are normally operated in similar fashion as a sillcock or hosecock, requiring extended manual turning of a valve handle to control flow rates between fully on and fully off conditions. The other type pinches the hose by use of components external to the flow path. They generally require an array of moving parts which involve multiple motions by the user in their operation. They typically flatten the hose to reduce flow, tending to significantly diametrically crease, and thus damage, the hose. Many of this second type afford only fully on or fully off options and those that permit variable flow involve a complex arrangement of moving parts or require multiple motions by the user to achieve a desired intermediate flow rate.

It is, therefore, an object of this invention to provide a fluid flow control valve which is pedal-operated. Another object of this invention is to provide a fluid flow control valve which can be applied anywhere along the length of a hose. It is also object of this invention to provide a fluid flow control valve which does not require introduction of a structural component into the fluid flow path. Still another object of this invention is to provide a fluid flow control valve which does not require use of more than one hose. A further object of this invention is to provide a fluid flow control valve which facilitates incremental changes in flow rate. Yet another object of this invention is to provide a fluid flow control valve which affords single-motion control of flow rates. An additional object of this invention is to provide a fluid flow control valve which eliminates need for manipulation of a sill cock to control flow. And it is an object of this invention to provide a fluid flow control valve which does not require flattening of a hose to control the rate of flow through the hose.

SUMMARY OF THE INVENTION

In accordance with the invention a pedal-operated fluid flow control valve is provided for controlling the rate of fluid flow in a soft hose under internal fluid pressure. The pedal valve cradles a substantially straight-line section of the hose so that a cross-sectional area of the cradled section can be controlled by hinged rotation of a compressing component toward or away from the cradling component about an axis substantially parallel to the cradled section. The valve is operated to reduce the cross-sectional area in response to a pedal force applied to the compressing component in a direction toward the cradling component and to expand the reduced cross-section in response to release of the pedal force to the internal fluid pressure of the hose. A latching component secures the compressing component in an angular orientation relative to the cradling component to maintain the reduced cross-sectional area. A latch releasing component is pedal operated to disengage the compressing component from the latching component.

Preferably, a cradle supports a section of the hose in a substantially straight line. A pinchcock is aligned to compress a cross-sectional area of the cradled section of the hose against the cradle. A hinge pivotally connects the pinchcock to the cradle along an axis parallel to the substantially straight line, The pinchcock compresses the cross-sectional area against the cradle in response to pedal pressure applied to the pinchcock. Release of the pinchcock allows the compressed cross-sectional area to expand in response to the internal fluid pressure of the hose. A latch for securing the pinchcock to the cradle at the angular orientation in which the cross-sectional area is reduced. A lever releases the latch from the pinchcock in response to pedal pressure applied to the lever.

More preferably, the cradle has a base contoured to rest on a flat surface. An approximately semi-cylindrical seat in the cradle supports the cradled hose section parallel to the flat surface. The pinchcock has an approximately circular disc transversely aligned in relation to the approximately semi-cylindrical seat. The pinchcock disc has a diameter not greater than the diameter of the cradle seat so as to permit compression of the cross-sectional area of the seated section of the hose against the cradle. The hinge pivotally connects the pinchcock to the cradle along an axis parallel to the substantially straight line of the hose section. The cradle seat has parallel ridges which straddle the central plane of the disc to enhance the compressive ability of the disc.

Most preferably, the pinchcock has an approximately semi-cylindrical seat aligned to mate with the approximately semi-cylindrical cradle seat to form an approximately cylindrical housing for the hose section. The cradle base is symmetrical in relation to a vertical plane. The cradle seat is perpendicular to the plane and extends across an intermediate portion of the base. The cradle has an upper portion which forms a ledge on the side of the cradle seat which is opposite the hinge. The pinchcock is also symmetrical in relation to the vertical plane. The pinchcock disc is aligned on the plane. The pinchcock has a lower portion which forms a stop. The pinchcock stop is aligned for abutment against the cradle ledge when the cylindrical housing is formed. The hinge is perpendicular to the vertical plane. The latch consists of a ratchet which extends upwardly from the cradle on a radial arc relative to the hinge and a pawl aligned on the pinchcock for engagement with the ratchet. The latch release is a lever which is an upward and outward extension of the ratchet.

BRIEF DESCRIPTION OF THE DRAWINGS

Other objects and advantages of the invention will become apparent upon reading the following detailed description and upon reference to the drawings in which.

Figure 1:
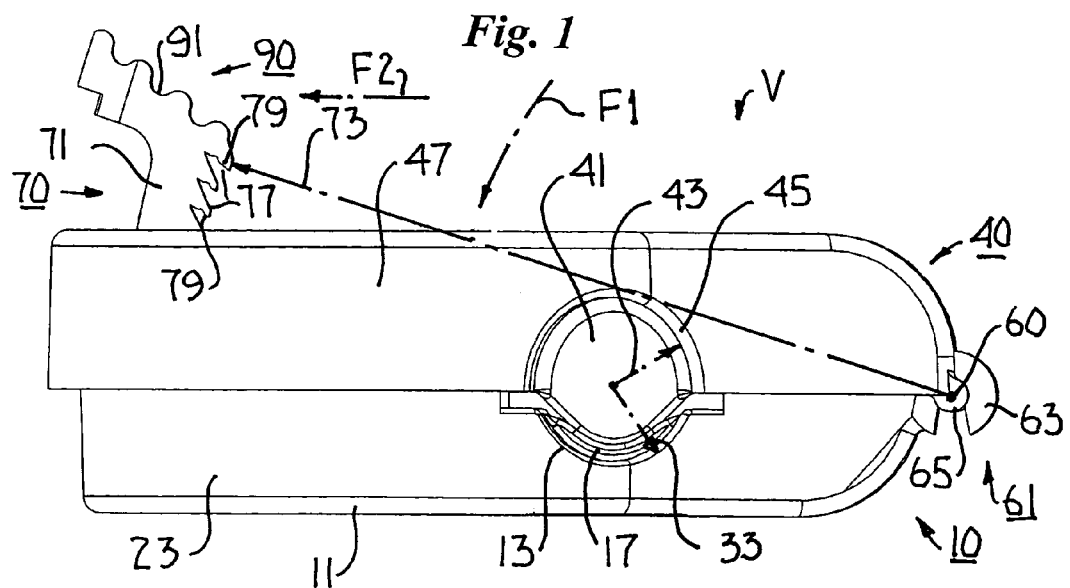
FIG. 1 is a left side elevation view of a pedal valve in a fully closed condition without a hose.

While the invention will be described in connection with a preferred embodiment thereof, it is not intended to limit the invention to that embodiment or to the details of the construction or arrangement of parts illustrated in the accompanying drawings.

DETAILED DESCRIPTION

Turning first to FIGS. 1-5, a pedal-operated fluid flow control valve V is provided for controlling the rate of fluid flow in a soft hose H under internal fluid pressure. The pedal valve V has a cradle 10 which supports a substantially straight-line section S of the hose H so that a cross-sectional area of the cradled section S can be controlled by the hinged rotation of a pinchcock 40 toward or away from the cradle 10 about an axis 60 substantially parallel to the straight-line section S. The valve V is operated to reduce the cross-sectional area of the cradled section S in response to a first pedal force F1 applied to the pinchcock 40 in a direction toward the cradle 10 and to expand the reduced cross-section in response to release of the pedal force F1 to the internal fluid pressure P of the hose H. A latch 70 secures the pinchcock 40 in an angular orientation relative to the cradle 10 to maintain the reduced cross-sectional area. A lever 90 is operated by a rearward pedal force F2 to disengage the pinchcock 40 from the latch 70.

Figure 4:
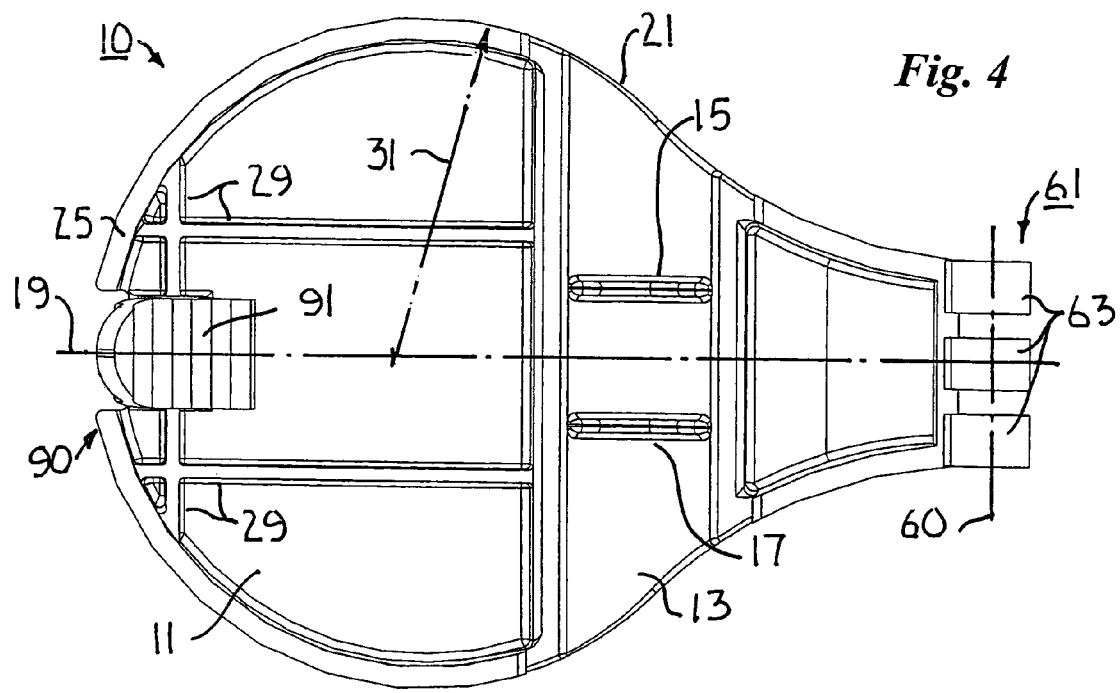
FIG. 4 is a top plan view of the cradle of the valve of FIG. 1.

As seen in FIG. 1, the cradle 10 has a base 11 contoured to rest on a flat surface. Looking at FIGS. 1, 2 and 4, an approximately semi-cylindrical seat 13 in the cradle 10 supports the cradled hose section S substantially parallel to the flat surface. As best seen in FIG. 4, the cradle seat 13 has parallel right and left ridges 15 and 17 which straddle the central vertical longitudinal plane 19 of the valve V. The cradle base 11 is symmetrical in relation to the vertical plane 19. The cradle seat 13 is substantially perpendicular to the vertical plane 19 and extends across an intermediate portion 21 of the base 11. Looking at FIGS. 1, 2 and 4, the cradle 10 has an upper portion on its side walls 23 which forms a ledge 25 on the side of the cradle seat 13 which is opposite the axis 60. The cradle 10 shown is, as best seen in FIG. 4, substantially circular in horizontal planes from the forward portion of the its seat 13 to the rear portion of the valve V and is strengthened by one or more reinforcing ribs 29. The cradle 10 may be made by injection molding of a plastic material, such as Polypropylene or formed from Nylon or metal. A suitable prototype cradle 10 has a radius 31 of approximately 2", a depth of approximately ⅞" and a seat 13 of approximately ½" radius.

Figure 5:
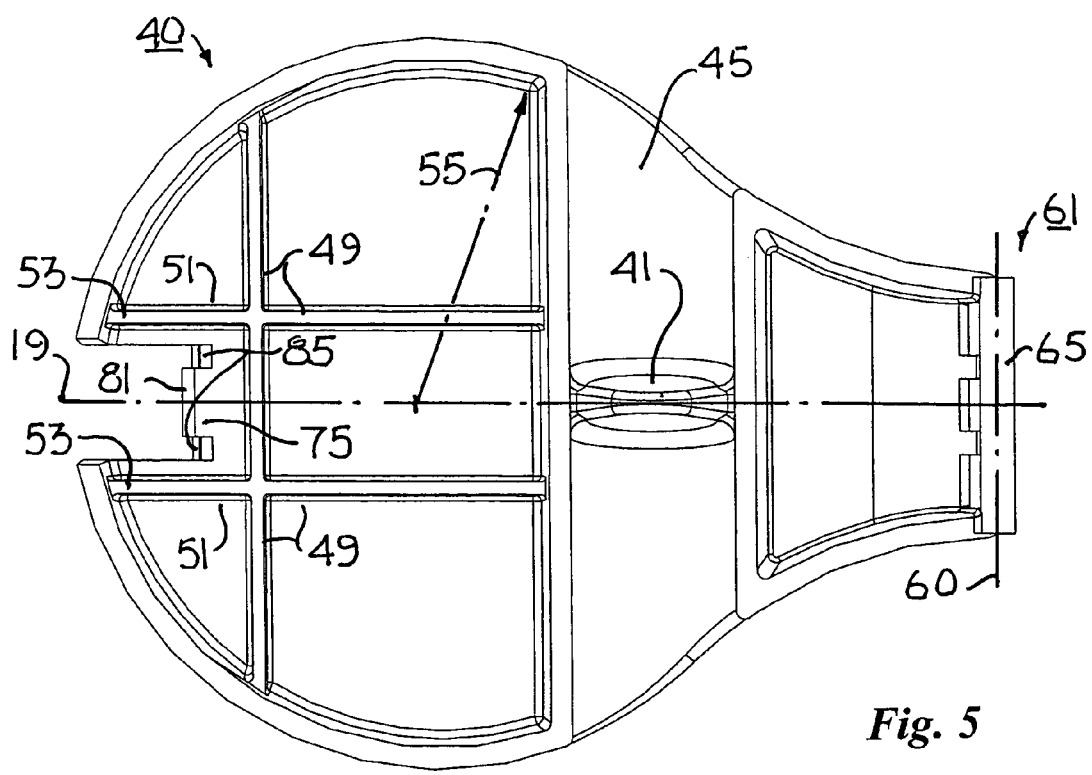
FIG. 5 is a bottom plan view of the pinchcock of the valve of FIG. 1.

Looking now at FIGS. 1 and 5, the pinchcock 40 has an approximately circular disc 41 transversely aligned, as shown perpendicularly aligned, in relation to the approximately semi-cylindrical cradle seat 13. The pinchcock disc 41 has a diameter 43 not greater than the diameter 33 of the cradle seat 13 so as to permit compression of the cross-sectional area of the seated section S of the hose H against the cradle 10. The cooperation of the cradle seat ridges 15 and 17 with the pinchcock disc 41 enhances the compressive ability of the disc 41. Most preferably, the pinchcock 40 has an approximately semi-cylindrical seat 45 aligned to mate with the approximately semi-cylindrical cradle seat 13 to form an approximately cylindrical housing for the hose section S. The pinchcock 40 shown is symmetrical in relation to the vertical plane 19 and the pinchcock disc 41 is aligned on the plane 19. The pinchcock 40 has side walls 47 which, as shown in FIG. 5, are substantially circular in horizontal planes from approximately the forward portion of the disc 41 to the rear portion of the valve V. The pinchcock is strengthened by one or more reinforcing ribs 49 and 51. As shown, the lower face of one or more of the ribs 51 forms a stop 53 on the side of the disc 41 which is opposite the axis 60. The pinchcock stop 53 is aligned for abutment against the cradle ledge 25 when the cylindrical housing is formed, reducing the cross-sectional area of the hose flow path to stop flow substantially completely. The pinchcock 40 may be made by injection molding of a plastic material, such as Polypropylene or formed from Nylon or metal. A suitable prototype pinchcock 40 for use with the above described prototype cradle 10 has an inside radius 55 of approximately 1¹⁵⁄₁₆", a depth of approximately ⅞" and a cover 45 of approximately ½" radius.

As best seen in FIGS. 1, 4 and 5, a hinge 61 pivotally connects the pinchcock 40 to the cradle 10 for rotation about the axis 60. Thus, in this preferred configuration, the hinge 61 is parallel to the cradle seat 13 and, therefore, also to the substantially straight line section S of the hose H, and perpendicular to the vertical center plane 19 of the valve V. In the embodiment shown, the hinge 61 consists of arcuate knuckles 63 molded on the front end of the cradle 10 which grip a pin 65 molded on the front end of the pinchcock 40.

Figure 2:
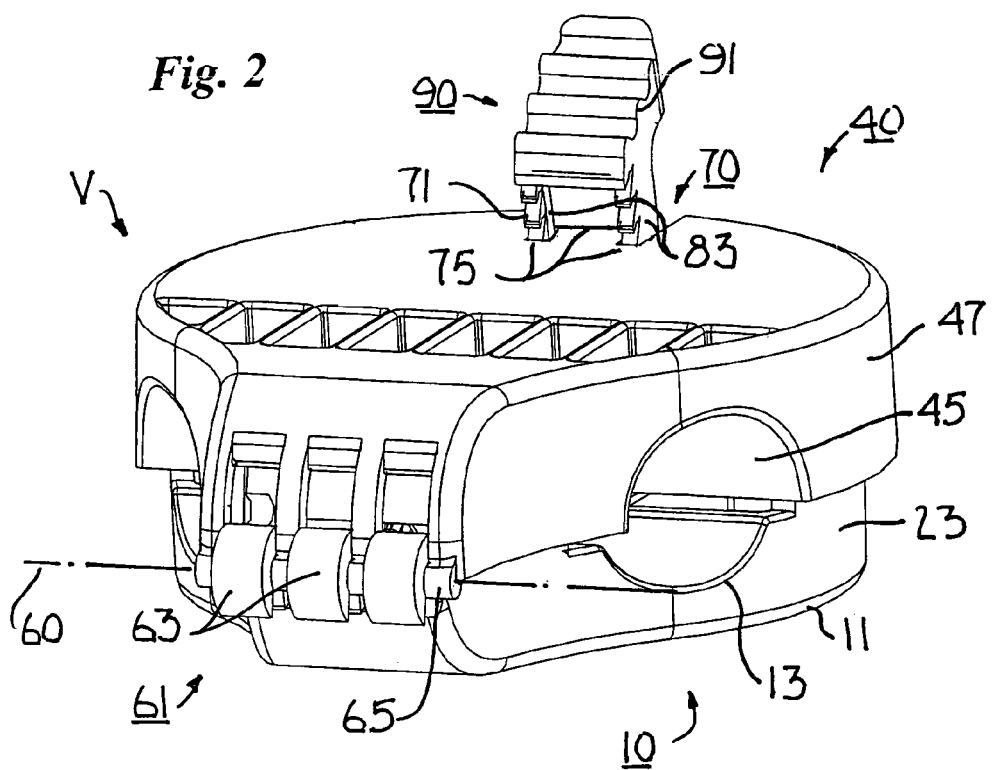
FIG. 2 is a front right perspective view of the valve of FIG. 1.
Figure 3:
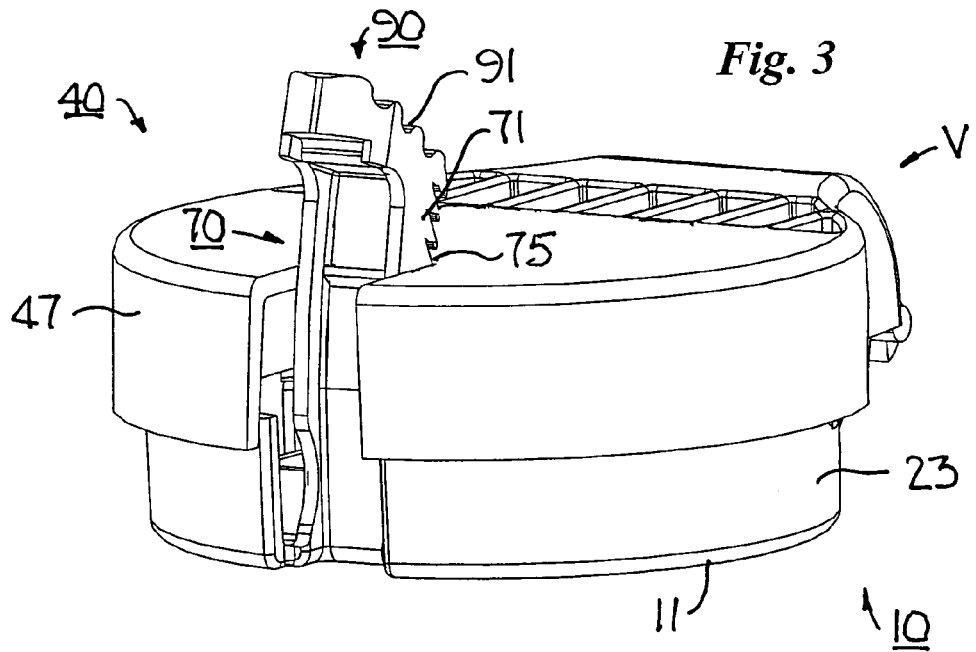
FIG. 3 is a rear left perspective view of the valve of FIG. 1.

Looking at FIGS. 1-3, the latch 70 consists of a ratchet 71, as shown molded with and extending upwardly from the cradle 10 on a radial arc 73 relative to the axis 60 of the hinge 61 and a pawl 75 molded with and aligned on the pinchcock 40 for engagement with the teeth 77 of the ratchet 71. Preferably, the teeth 77 have a downturned end portion 79 to deter inadvertent disengagement of the pawl 75 from the ratchet 71 and the pawl 75 has a beveled edge 81 to facilitate easy sliding engagement of the pawl 75 over the teeth 77. As best seen in FIG. 2, the pawl 75 slides between the side walls 83 of the latch 70 and the side walls 83 fit in grooves 85 on each side of the pawl 75 so as to align and stabilize the valve V in the latched condition. On the prototype above described, the ratchet radius 73 is approximately 4½" and there are five teeth 77 spaced at approximately ⅛" intervals.

As seen in FIGS. 1-4, the lever 90 is an upward and outward extension from the top of the ratchet 71. It has a corrugated upper surface 91 which is inclined so that, when a generally horizontal pedal force F2 is applied to the lever 90 as shown in FIG. 1, the lever 90 flexes to the rear of the valve V to disengage the ratchet teeth 77 from the pawl 75. The lever 90, as shown, is molded with the latch 70.

Figure 8:
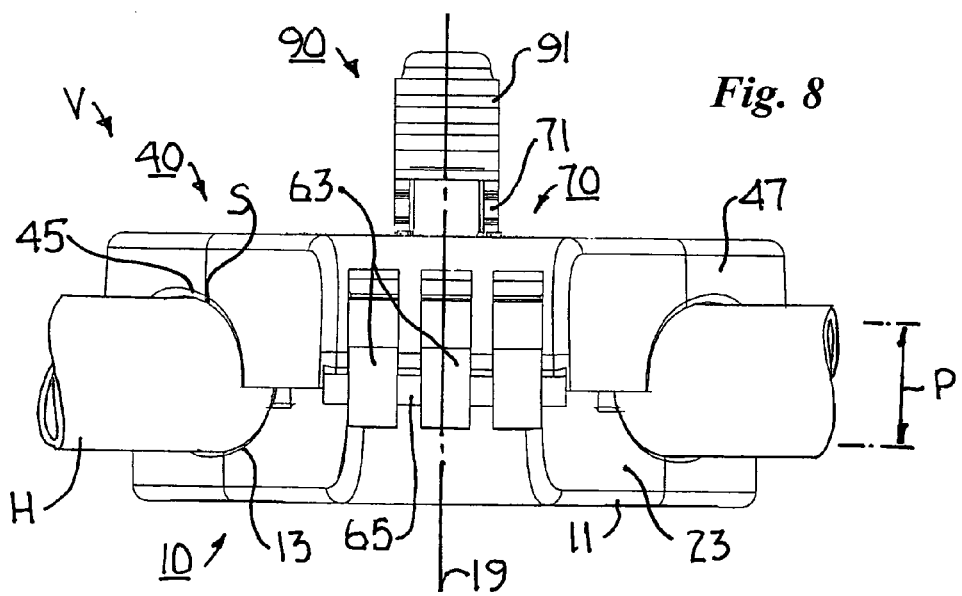
FIG. 8 is a front elevation view of the valve of FIG. 1 in a fully closed condition with a hose in its cradle.
Figure 6:
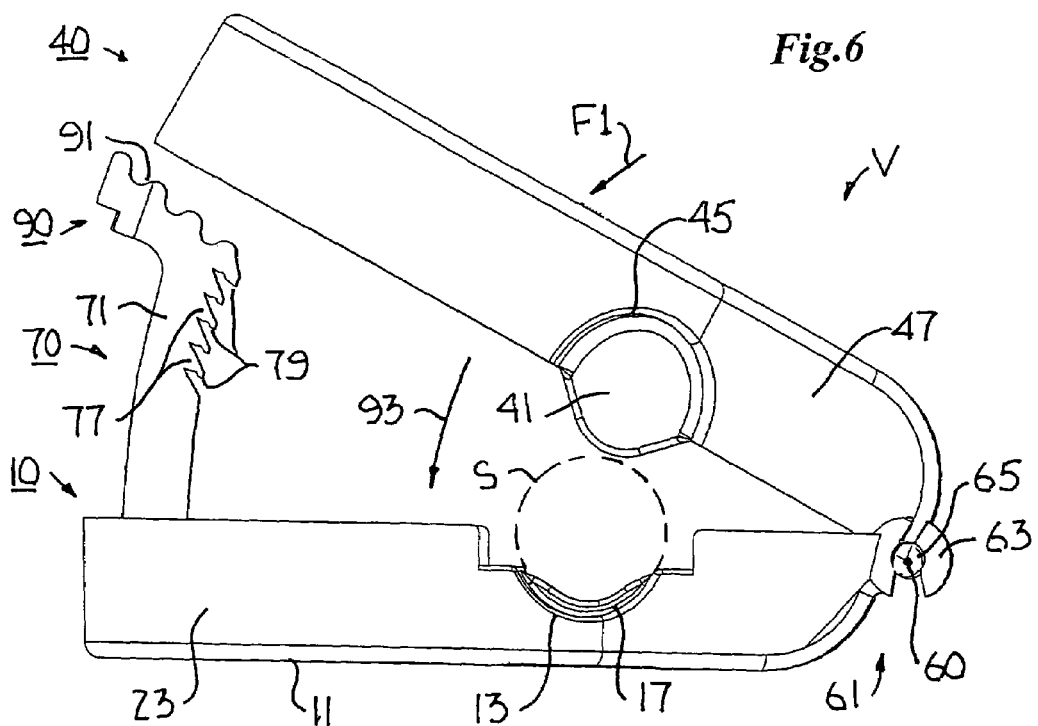
FIG. 6 is a left side elevation view of the valve of FIG. 1 in a partially open and unlatched condition.
Figure 7:
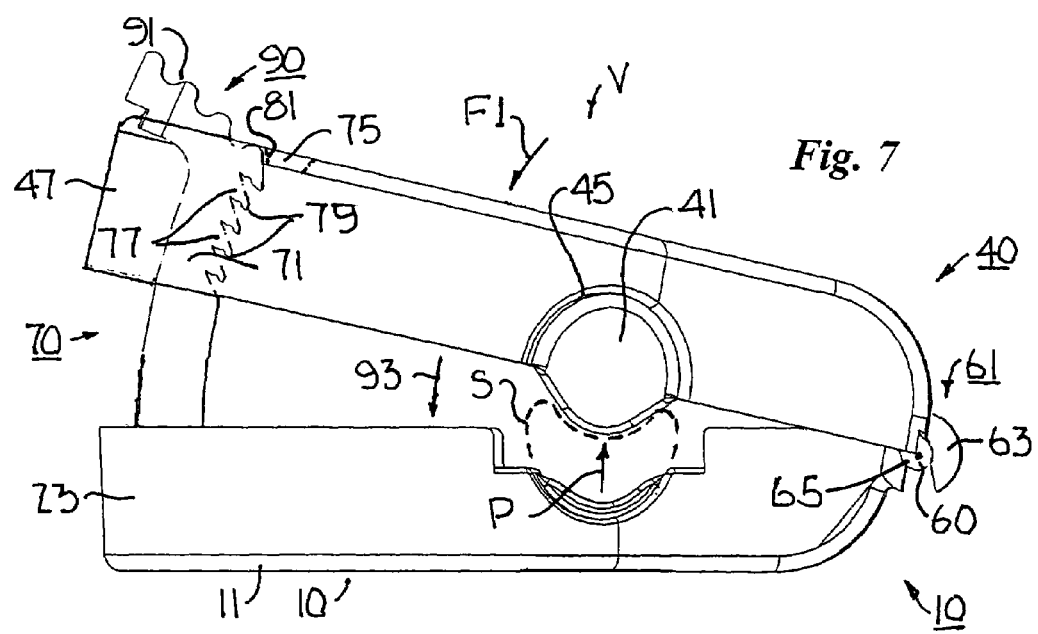
FIG. 7 is a left side elevation view of the valve of FIG. 1 in a partially closed and latched condition.

The operation of the valve V can be best understood in relation to FIGS. 6-8. In FIG. 6, the valve V has a hose section S resting in the cradle seat 13 and the pinchcock 40 is rotated in a closing direction 93 until the disc 41 contacts the hose section S. The ratchet 71 has not yet engaged the pawl 75. Looking at FIG. 7, as pedal pressure F1 is applied to the pinchcock 40, the pinchcock disc 41 begins to compress the hose section S, reducing the cross-sectional area of the hose flow path. The pawl will 75 will eventually contact the uppermost of the ratchet teeth 77 which pushes the ratchet to the rear until it snaps over the pawl 75. In this condition, flow is partially reduced. The pawl 75 will incrementally engage sequentially downward teeth 75 as long as the pedal pressure F1 is maintained until the hose section S is fully compressed, substantially cutting off all flow, as seen in FIG. 8. When pedal pressure F1 is terminated, the pawl 75 will remain engaged on the lowermost of the ratchet teeth 77 which the pawl 75 has passed over. Thus, the pedal operation can be used to select from a variety of flow rates corresponding to their respective ratchet teeth 77. Application of the rearward pedal force F2 to the lever 90 will disengage the pawl 75 from the ratchet teeth 77. The internal pressure P in the hose section S will cause the hose section S to expand against the disc 41, raising the pinchcock 40 until the pedal force F2 is released. The flow rate will increase to the level permitted by the lowermost of the ratchet teeth 77 above the pawl 75 when the force F2 is released. If the pawl 75 has passed the uppermost of the ratchet teeth 77 when the pressure F2 is released, the valve V is fully open and maximum flow will occur through the hose section S.

Thus, it is apparent that there has been provided, in accordance with the invention, a fluid flow control valve that fully satisfies the aims and advantages set forth above. While the invention has been described in conjunction with a specific embodiment thereof, many alternatives, modifications and variations will be apparent to those skilled in the art in light of the foregoing description. Accordingly, it is intended to embrace all such alternatives, modifications and variations as fall within the spirit of the appended claims.

What is claimed is:

1. A pedal valve for controlling a rate of fluid flow in a soft hose under internal fluid pressure, the pedal valve comprising:
    means for cradling a section of the hose in a substantially straight line;
    means carrying a circular disc for compressing a cross-sectional area of the cradled section of the hose; and
    means for hinging said compressing means for rotation about an axis substantially parallel to said substantially straight line toward and away from said cradling means to permit reduction of said cross-sectional area by said circular disc in response to a force applied to said compressing means in a direction toward said cradling means and to permit expansion of said reduced cross-section in response to the internal fluid pressure of the hose.

2. The pedal valve according to claim 1 further comprising means for latching said compressing means in an angular orientation relative to said cradling means in which said cross-sectional area is reduced.

3. The pedal valve according to claim 2 further comprising means for releasing said compressing means from said angular orientation in response to a force applied to said latching means.

4. A pedal valve for controlling a rate of fluid flow in a soft hose under internal fluid pressure, the pedal valve comprising:
    a cradle for supporting a section of the hose in a substantially straight line;
    a pinchcock carrying a circular disc aligned to compress a cross-sectional area of the cradled section of the hose against said cradle; and
    a hinge pivotally connecting said pinchcock to said cradle along an axis parallel to said substantially straight line to permit said pinchcock circular disc to compress said cross-sectional area against said cradle in response to a force applied to said hingecock in a direction toward said cradle and to permit said pinchcock circular disc to release said compressed cross-sectional area to expand in response to the internal fluid pressure of the hose.

5. The pedal valve according to claim 4 further comprising a latch for securing said pinchcock to said cradle at an angular orientation in which said cross-sectional area is reduced.

6. The pedal valve according to claim 5 further comprising a lever for releasing said latch from said pinchcock.

7. A pedal valve for controlling a rate of fluid flow in a soft hose under internal fluid pressure, the pedal valve comprising:
    a cradle having a base contoured to rest on a flat surface and an approximately semi-cylindrical seat for supporting a section of the hose in a substantially straight line parallel to the flat surface;
    a pinchcock having an approximately circular disc transversely aligned in relation to said approximately semi-cylindrical seat, said pinchcock disc being of diameter not greater than a diameter of said cradle seat to permit compression of a cross-sectional area of the seated section of the hose against said cradle; and
    a hinge pivotally connecting said pinchcock to said cradle along an axis parallel to said substantially straight line to permit said disc to compress said cross-sectional area against said cradle seat in response to a force applied to said pinchcock in a direction toward said cradle and to permit said disc to release said compressed cross-sectional area to expand in response to the internal fluid pressure of the hose.

8. The pedal valve according to claim 7 further comprising a latch for securing said pinchcock to said cradle at an angular orientation in which said cross-sectional area is reduced.

9. The pedal valve according to claim 8 further comprising a lever for releasing said latch from said pinchcock.

10. The pedal valve according to claim 7, said cradle seat having parallel ridges straddling a plane of said disc.

11. The pedal valve according to claim 7, said pinchcock having an approximately semi-cylindrical seat aligned for rotating toward mating alignment with said cradle seat to form an approximately cylindrical housing for the hose section.

12. The pedal valve according to claim 11:
    said cradle base being symmetrical in relation to a vertical plane, said cradle seat being perpendicular to said plane and extending across an intermediate portion of said base and said cradle having an upper portion forming a ledge on a side of said seat opposite said hinge;
    said pinchcock being symmetrical in relation to said vertical plane, said pinchcock disc being aligned on said plane and said pinchcock having a lower portion forming a stop, said stop being aligned for abutment against said ledge when said cylindrical housing is formed; and
    said hinge being perpendicular to said vertical plane.

13. The pedal valve according to claim 12 further comprising a latch for securing said pinchcock to said cradle at an angular orientation in which said cross-sectional area is reduced.

14. The pedal valve according to claim 13, said latch comprising:
- a ratchet extending upwardly from said cradle on a radial arc relative said hinge; and
- a pawl aligned on said pinchcock for engagement with said ratchet.

15. The pedal valve according to claim 14 further comprising a lever for releasing said latch from said pinchcock.

16. The pedal valve according to claim 15, said lever comprising an upward and outward extension of said ratchet.

17. The pedal valve according to claim 12, said cradle seat having parallel ridges straddling said vertical plane.

* * * * *